United States Patent
Millet

(10) Patent No.: US 9,998,337 B2
(45) Date of Patent: *Jun. 12, 2018

(54) IDENTIFYING NODES IN A RING NETWORK

(71) Applicant: Fortinet, Inc., Sunnyvale, CA (US)

(72) Inventor: Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/385,492

(22) Filed: Dec. 20, 2016

(65) Prior Publication Data

US 2017/0104638 A1 Apr. 13, 2017

Related U.S. Application Data

(60) Continuation of application No. 14/828,277, filed on Aug. 17, 2015, now Pat. No. 9,602,303, which is a
(Continued)

(51) Int. Cl.
*H04L 12/433* (2006.01)
*H04L 12/841* (2013.01)
*H04L 12/24* (2006.01)

(52) U.S. Cl.
CPC .......... *H04L 41/12* (2013.01); *H04L 12/433* (2013.01); *H04L 47/286* (2013.01)

(58) Field of Classification Search
CPC .................. H04L 12/42–12/437; H04L 41/12
See application file for complete search history.

(56) References Cited

U.S. PATENT DOCUMENTS

| 4,590,468 A | 5/1986 | Stieglitz |
| 4,667,287 A | 5/1987 | Allen et al. |

(Continued)

FOREIGN PATENT DOCUMENTS

| WO | 0051290 | 8/2000 |
| WO | 0076152 | 12/2000 |

(Continued)

OTHER PUBLICATIONS

Notice of Allowance for U.S. Appl. No. 14/178,215 dated Jul. 15, 2015.
(Continued)

*Primary Examiner* — Timothy J Weidner
(74) *Attorney, Agent, or Firm* — Hamilton, DeSanctis & Cha LLP

(57) ABSTRACT

Methods and systems for determining a token master on a ring network are provided. According to one embodiment, a ring controller of a first blade participating in the ring network receives an indication that an arbitration token originated by an originating blade has been received. The ring controller compares the priorities of the originating blade and the first blade. When the priority of the originating blade is higher, the ring controller transmits the arbitration token to the next blade. When the priority of the originating blade is lower, the ring controller sets the first blade as the originating blade and transmits the arbitration token to the next blade. When the priorities are equal, the ring controller assumes the role of the token master, which is responsible for periodically transmitting a discovery marker onto the ring network to facilitate topology discovery.

20 Claims, 6 Drawing Sheets

Related U.S. Application Data continuation of application No. 13/532,771, filed on Jun. 25, 2012, now Pat. No. 9,143,351, which is a continuation of application No. 12/762,362, filed on Apr. 18, 2010, now Pat. No. 8,208,409, which is a continuation-in-part of application No. 11/460,977, filed on Jul. 29, 2006, now Pat. No. 7,890,663, which is a division of application No. 09/894,471, filed on Jun. 28, 2001, now Pat. No. 7,181,547.

(56) References Cited

U.S. PATENT DOCUMENTS

| | | |
|---|---|---|
| 4,667,323 A | 5/1987 | Engdahl et al. |
| 4,726,018 A | 2/1988 | Bux et al. |
| 5,473,599 A | 12/1995 | Li et al. |
| 5,490,252 A | 2/1996 | Macera et al. |
| 5,568,525 A | 10/1996 | de Nijs et al. |
| 5,581,705 A | 12/1996 | Passint et al. |
| 5,598,414 A | 1/1997 | Walser et al. |
| 5,633,866 A | 5/1997 | Callon |
| 5,745,778 A | 4/1998 | Alfieri |
| 5,784,648 A | 7/1998 | Duckwall |
| 5,812,819 A | 9/1998 | Rodwin et al. |
| 5,825,772 A | 10/1998 | Dobbins et al. |
| 5,841,973 A | 11/1998 | Kessler et al. |
| 5,875,290 A | 2/1999 | Bartfai et al. |
| 5,881,236 A | 3/1999 | Dickey |
| 5,892,924 A | 4/1999 | Lyon et al. |
| 5,920,702 A | 7/1999 | Lyon et al. |
| 5,963,555 A | 10/1999 | Takase et al. |
| 5,987,521 A | 11/1999 | Arrowood et al. |
| 6,014,382 A | 1/2000 | Takihiro et al. |
| 6,014,669 A | 1/2000 | Slaughter et al. |
| 6,032,193 A | 2/2000 | Sullivan |
| 6,047,330 A | 4/2000 | Stracke |
| 6,069,895 A | 5/2000 | Ayandeh |
| 6,081,508 A | 6/2000 | West et al. |
| 6,085,238 A | 7/2000 | Yuasa et al. |
| 6,098,110 A | 7/2000 | Witkowski et al. |
| 6,108,699 A | 8/2000 | Moiin |
| 6,118,791 A | 9/2000 | Fichou et al. |
| 6,137,777 A | 10/2000 | Vaid et al. |
| 6,141,349 A | 10/2000 | Ikeda et al. |
| 6,169,739 B1 | 1/2001 | Isoyama |
| 6,169,793 B1 | 1/2001 | Godwin et al. |
| 6,175,867 B1 | 1/2001 | Taghadoss |
| 6,192,051 B1 | 2/2001 | Lipman |
| 6,220,768 B1 | 4/2001 | Barroux |
| 6,226,788 B1 | 5/2001 | Schoening et al. |
| 6,243,580 B1 | 6/2001 | Garner |
| 6,246,682 B1 | 6/2001 | Roy et al. |
| 6,249,519 B1 | 6/2001 | Rangachar |
| 6,260,072 B1 | 7/2001 | Rodriguez |
| 6,260,073 B1 | 7/2001 | Walker et al. |
| 6,266,695 B1 | 7/2001 | Huang et al. |
| 6,269,099 B1 | 7/2001 | Borella |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,304,557 B1 | 10/2001 | Nakazumi |
| 6,330,602 B1 | 12/2001 | Law et al. |
| 6,338,092 B1 | 1/2002 | Chao et al. |
| 6,405,262 B1 | 6/2002 | Vogel et al. |
| 6,414,595 B1 | 7/2002 | Scrandis et al. |
| 6,434,619 B1 | 8/2002 | Lim et al. |
| 6,438,612 B1 | 8/2002 | Ylonen et al. |
| 6,449,650 B1 | 9/2002 | Westfall et al. |
| 6,463,061 B1 | 10/2002 | Rekhter et al. |
| 6,466,976 B1 | 10/2002 | Alles et al. |
| 6,493,349 B1 | 10/2002 | Casey |
| 6,526,056 B1 | 2/2003 | Rekhter et al. |
| 6,532,088 B1 | 3/2003 | Dantu |
| 6,542,502 B1 | 4/2003 | Herring et al. |
| 6,549,954 B1 | 4/2003 | Lambrecht et al. |
| 6,556,544 B1 | 4/2003 | Lee |
| 6,608,816 B1 | 8/2003 | Nichols |
| 6,611,522 B1 | 8/2003 | Zheng et al. |
| 6,636,516 B1 | 10/2003 | Yamano |
| 6,639,897 B1 | 10/2003 | Shiomoto et al. |
| 6,658,013 B1 | 12/2003 | de Boer et al. |
| 6,697,359 B1 | 2/2004 | George |
| 6,697,360 B1 | 2/2004 | Gai et al. |
| 6,738,371 B1 | 5/2004 | Ayres |
| 6,769,124 B1 | 7/2004 | Schoening et al. |
| 6,775,267 B1 | 8/2004 | Kung |
| 6,785,224 B2 | 8/2004 | Uematsu et al. |
| 6,820,210 B1 | 11/2004 | Daruwalla et al. |
| 6,822,958 B1 | 11/2004 | Branth et al. |
| 6,862,279 B1 | 3/2005 | Imai et al. |
| 6,868,082 B1 | 3/2005 | Allen et al. |
| 6,883,170 B1 | 7/2005 | Garcia |
| 6,920,146 B1 | 7/2005 | Johnson et al. |
| 6,922,774 B2 | 7/2005 | Meushaw et al. |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton et al. |
| 6,982,987 B2 | 1/2006 | Cain |
| 6,985,438 B1 | 1/2006 | Tschudin |
| 6,985,956 B2 | 1/2006 | Luke et al. |
| 7,002,965 B1 | 2/2006 | Cheriton |
| 7,020,143 B2 | 3/2006 | Zdan |
| 7,028,333 B2 | 4/2006 | Tuomenoksa et al. |
| 7,042,848 B2 | 5/2006 | Santiago et al. |
| 7,062,642 B1 | 6/2006 | Langrind et al. |
| 7,082,477 B1 | 7/2006 | Sadhasivam et al. |
| 7,089,293 B2 | 8/2006 | Gronser et al. |
| 7,096,383 B2 | 8/2006 | Talaugon et al. |
| 7,096,495 B1 | 8/2006 | Warrier et al. |
| 7,111,072 B1 | 9/2006 | Matthews et al. |
| 7,116,665 B2 | 10/2006 | Balay et al. |
| 7,117,530 B1 | 10/2006 | Lin |
| 7,159,031 B1 | 1/2007 | Larkin et al. |
| 7,161,904 B2 | 1/2007 | Hussain et al. |
| 7,174,372 B1 | 2/2007 | Sarkar |
| 7,177,311 B1 | 2/2007 | Hussain et al. |
| 7,181,547 B1 * | 2/2007 | Millet .................. H04L 41/12 370/258 |
| 7,181,766 B2 | 2/2007 | Bendinelli et al. |
| 7,203,192 B2 | 4/2007 | Desai et al. |
| 7,263,106 B2 | 4/2007 | Matthews et al. |
| 7,225,259 B2 | 5/2007 | Ho et al. |
| 7,266,120 B2 | 9/2007 | Cheng et al. |
| 7,272,643 B1 | 9/2007 | Sarkar et al. |
| 7,278,055 B2 | 10/2007 | Talugon et al. |
| 7,313,614 B2 | 12/2007 | Considine et al. |
| 7,337,221 B2 | 2/2008 | Radi et al. |
| 7,340,535 B1 | 3/2008 | Alam |
| 7,376,125 B1 | 5/2008 | Hussain et al. |
| 7,376,827 B1 | 5/2008 | Jiao |
| 7,386,010 B2 | 6/2008 | Solomon et al. |
| 7,389,358 B1 | 6/2008 | Matthews |
| 7,499,419 B2 | 3/2009 | Balay et al. |
| 7,522,604 B2 | 4/2009 | Hussain et al. |
| 7,580,373 B2 * | 8/2009 | Millet .................. H04L 41/12 370/258 |
| 7,668,087 B2 | 2/2010 | Hussain et al. |
| 7,720,053 B2 | 5/2010 | Hussain et al. |
| 7,881,244 B2 | 2/2011 | Balay et al. |
| 7,890,663 B2 * | 2/2011 | Millet .................. H04L 41/12 370/258 |
| 7,933,269 B2 | 4/2011 | Cheng et al. |
| 8,208,409 B2 * | 6/2012 | Millet .................. H04L 41/12 370/258 |
| 8,213,347 B2 | 7/2012 | Balay et al. |
| 8,369,258 B2 | 2/2013 | Balay et al. |
| 8,953,513 B2 | 2/2015 | Balay et al. |
| 9,124,555 B2 | 9/2015 | Sun et al. |
| 9,143,351 B2 * | 9/2015 | Millet .................. H04L 41/12 370/258 |
| 9,160,716 B2 | 10/2015 | Sun et al. |
| 9,185,050 B2 | 11/2015 | Desai et al. |
| 9,331,961 B2 | 5/2016 | Desai et al. |

(56) References Cited

U.S. PATENT DOCUMENTS

| | | | |
|---|---|---|---|
| 9,509,638 | B2 | 11/2016 | Desai et al. |
| 9,602,303 | B2* | 3/2017 | Millet .................... H04L 41/12 370/258 |
| 2001/0043571 | A1 | 11/2001 | Jang et al. |
| 2001/0048661 | A1 | 12/2001 | Clear et al. |
| 2001/0052013 | A1 | 12/2001 | Munguia et al. |
| 2002/0062344 | A1 | 5/2002 | Ylonen et al. |
| 2002/0066034 | A1 | 5/2002 | Schlossberg et al. |
| 2002/0075901 | A1 | 6/2002 | Perlmutter et al. |
| 2002/0097872 | A1 | 7/2002 | Barbas et al. |
| 2002/0099849 | A1 | 7/2002 | Alfieri et al. |
| 2002/0116529 | A1 | 8/2002 | Hayden |
| 2002/0145981 | A1 | 10/2002 | Klinker et al. |
| 2002/0152373 | A1 | 10/2002 | Sun |
| 2002/0186661 | A1 | 12/2002 | Santiago et al. |
| 2002/0186667 | A1 | 12/2002 | Mor et al. |
| 2002/0191604 | A1 | 12/2002 | Mitchell et al. |
| 2003/0033401 | A1 | 2/2003 | Poisson et al. |
| 2003/0063348 | A1 | 4/2003 | Posey |
| 2003/0081559 | A1 | 5/2003 | Matuoka |
| 2003/0091021 | A1 | 5/2003 | Trossen et al. |
| 2003/0093557 | A1 | 5/2003 | Giraud et al. |
| 2003/0108041 | A1 | 6/2003 | Aysan |
| 2003/0115308 | A1 | 6/2003 | Best et al. |
| 2003/0117954 | A1 | 6/2003 | De Neve et al. |
| 2003/0120806 | A1 | 6/2003 | Clune et al. |
| 2003/0131228 | A1 | 7/2003 | Tworney |
| 2003/0169747 | A1 | 9/2003 | Wang |
| 2003/0185221 | A1 | 10/2003 | Deikman et al. |
| 2003/0200295 | A1 | 10/2003 | Roberts et al. |
| 2003/0212735 | A1 | 11/2003 | Hicok et al. |
| 2003/0223361 | A1 | 12/2003 | Hussain et al. |
| 2003/0223406 | A1 | 12/2003 | Balay |
| 2004/0006601 | A1 | 1/2004 | Bernstein et al. |
| 2004/0037279 | A1 | 2/2004 | Zelig |
| 2004/0042416 | A1 | 3/2004 | Ngo et al. |
| 2004/0078772 | A1 | 4/2004 | Balay |
| 2004/0095934 | A1 | 5/2004 | Cheng et al. |
| 2004/0141521 | A1 | 7/2004 | George |
| 2005/0047407 | A1 | 3/2005 | Desai |
| 2005/0083927 | A1 | 4/2005 | Lien et al. |
| 2005/0147095 | A1 | 7/2005 | Guerrero et al. |
| 2005/0163115 | A1 | 7/2005 | Dontu et al. |
| 2006/0087969 | A1 | 4/2006 | Santiago et al. |
| 2006/0265519 | A1 | 11/2006 | Millet |
| 2007/0058648 | A1 | 3/2007 | Millet |
| 2007/0064704 | A1 | 3/2007 | Balay |
| 2007/0073733 | A1 | 3/2007 | Matthews |
| 2007/0083528 | A1 | 4/2007 | Matthews et al. |
| 2007/0104119 | A1 | 5/2007 | Sarkar |
| 2007/0109968 | A1 | 5/2007 | Hussain |
| 2007/0110062 | A1 | 5/2007 | Balay et al. |
| 2007/0115979 | A1 | 5/2007 | Balay |
| 2007/0121579 | A1 | 5/2007 | Matthews |
| 2007/0127382 | A1 | 6/2007 | Hussain |
| 2007/0147368 | A1 | 6/2007 | Desai |
| 2007/0291755 | A1 | 9/2007 | Cheng et al. |
| 2008/0013470 | A1 | 1/2008 | Kopplin |
| 2008/0016389 | A1 | 1/2008 | Talugon |
| 2009/0225754 | A1 | 9/2009 | Balay et al. |
| 2010/0142527 | A1 | 6/2010 | Balay et al. |
| 2010/0189016 | A1 | 7/2010 | Millet |
| 2011/0122872 | A1 | 5/2011 | Balay et al. |
| 2013/0022049 | A1 | 1/2013 | Millet |
| 2013/0156033 | A1 | 6/2013 | Balay et al. |
| 2015/0019859 | A1 | 1/2015 | Sun et al. |
| 2015/0095636 | A1 | 4/2015 | Sun et al. |
| 2015/0195098 | A1 | 7/2015 | Cheng et al. |
| 2015/0358210 | A1 | 12/2015 | Millet |
| 2016/0142384 | A1 | 5/2016 | Sun |
| 2016/0308788 | A1 | 10/2016 | Desai et al. |
| 2017/0195289 | A1 | 7/2017 | Sun et al. |

FOREIGN PATENT DOCUMENTS

| | | |
|---|---|---|
| WO | 0163809 | 8/2001 |
| WO | 0223855 | 3/2002 |
| WO | 0310323 | 12/2003 |

OTHER PUBLICATIONS

Non-Final Rejection for U.S. Appl. No. 14/714,270 dated Jul. 29, 2015.
Notice of Allowance for U.S. Appl. No. 12/762,362 dated May 22, 2012.
Non-Final Rejection for U.S. Appl. No. 12/762,362 dated Feb. 2, 2012.
Notice of Allowance for U.S. Appl. No. 11/460,977 dated Dec. 27, 2010.
Non-Final Rejection for U.S. Appl. No. 11/460,977 dated Jul. 2, 2010.
Restriction Requirement for U.S. Appl. No. 11/460,977 dated Mar. 5, 2010.
Notice of Allowance for U.S. Appl. No. 13/532,771 dated Aug. 17, 2015.
Non-Final Rejection for U.S. Appl. No. 14/866,898 dated Dec. 4, 2015.
Notice of Allowance for U.S. Appl. No. 14/543,797 dated Sep. 1, 2015.
Non-Final Rejection for U.S. Appl. No. 11/556,159 dated Jan. 22, 2009.
Notice of Allowance for U.S. Appl. No. 11/556,159 dated Jul. 9, 2009.
Non-Final Rejection for U.S. Appl. No. 14/633,981 dated Feb. 11, 2016.
Notice of Allowance for U.S. Appl. No. 15/008,270 dated May 18, 2016.
Non-Final Rejection for U.S. Appl. No. 15/184,897 dated Sep. 29, 2016.
Notice of Allowance for U.S. Appl. No. 15/071,995 dated Oct. 24, 2016.
Notice of Allowance for U.S. Appl. No. 14/828,277 dated Dec. 14, 2016.
Non-Final Rejection for U.S. Appl. No. 14/828,277 dated Jul. 19, 2016.
Non-Final Rejection for U.S. Appl. No. 15/469,094 dated Jun. 14, 2017.
Office Action dated Nov. 5, 2003 for U.S. Appl. No. 09/661,130.
Notice of Allowance dated Jun. 14, 2007 for U.S. Appl. No. 10/067,106.
Office Action dated Nov. 16, 2006 for U.S. Appl. No. 10/067,106.
Office Action dated Jun. 3, 2004 for U.S. Appl. No. 09/663,483.
Office Action dated Aug. 21, 2003 for U.S. Appl. No. 09/663,483.
Office Action dated May 5, 2004 for U.S. Appl. No. 09/661,637.
Notice of Allowance dated Jul. 30, 2007 for U.S. Appl. No. 09/663,485.
Office Action dated Jan. 11, 2007 for U.S. Appl. No. 09/663,485.
Office Action dated Dec. 21, 2004 for U.S. Appl. No. 09/663,485.
Office Action dated May 14, 2004 for U.S. Appl. No. 09/663,485.
Office Action dated Sep. 8, 2003 for U.S. Appl. No. 09/663,485.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
IEEE Potentials Publication; "Local Area Networks" Dec. 1995/Jan. 1996; pp. 6. http://www.ece.uc.edu/-paw/potentials/sample.
Office Action dated Oct. 18, 2007 for U.S. Appl. No. 09/663,483.
Office Action dated Oct. 16, 2007 for U.S. Appl. No. 09/661,130.
Office Action dated Nov. 28, 2007 for U.S. Appl. No. 09/952,520.
Notice of Allowance dated Dec. 1, 2004 for U.S. Appl. No. 09/661,636.
Office Action dated May 28, 2004 for U.S. Appl. No. 09/661,636.
Office Action dated Nov. 18, 2003 U.S. Appl. No. 09/661,636.
Office Action dated Dec. 28, 2006 for U.S. Appl. No. 09/661,130.
Office Action dated Oct. 18, 2004 for U.S. Appl. No. 09/661,130.

(56) References Cited

OTHER PUBLICATIONS

Office Action dated Oct. 26, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Office Action dated Jul. 18, 2006 for U.S. Appl. No. 09/771,346.
Office Action dated Jan. 25, 2005 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Office Action dated Nov. 3, 2006 for U.S. Appl. No. 10/163,261.
Office Action dated Nov. 7, 2006 for U.S. Appl. No. 10/163,071.
Office Action dated Aug. 8, 2007 for U.S. Appl. No. 09/663,457.
Office Action dated May 17, 2007 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Office Action dated Feb. 24, 2006 for U.S. Appl. No. 09/663,484.
Office Action dated Apr. 6, 2005 for U.S. Appl. No. 09/663,484.
Office Action dated May 6, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Office Action dated Jun. 1, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Office Action dated Oct. 27, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Office Action dated Sep. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Office Action dated Jul. 3, 2007 for U.S. Appl. No. 10/163,071.
Office Action dated Aug. 1, 2007 for U.S. Appl. No. 10/163,260.
Office Action dated Apr. 13, 2007 for U.S. Appl. No. 10/163,260.
Office Action dated Dec. 21, 2006 for U.S. Appl. No. 10/163,260.
Office Action dated May 18, 2006 for U.S. Appl. No. 10/163,260.
Office Action dated Sep. 11, 2007 for U.S. Appl. No. 09/661,637.
Office Action dated Feb. 8, 2007 for U.S. Appl. No. 09/661,637.
Office Action dated Dec. 23, 2004 for U.S. Appl. No. 09/661,637.
Non-Final Office Action for U.S. Appl. No. 09/952,520, dated May 30, 2008.
Fowler, D., "VPNs Become a Virtual Reality." Netnews, Apr./May 1998. pp. 1-4.
Non-Final Office Action for U.S. Appl. No. 11/556,697, dated Jul. 9, 2008.
Non-Final Office Action for U.S. Appl. No. 09/663,457, dated Jul. 15, 2008.
Restriction Requirement for U.S. Appl. No. 10/991,970, dated Jul. 15, 2008.
Final Office Action for U.S. Appl. No. 10/650,298, dated Sep. 3, 2008.
Final Office Action for U.S. Appl. No. 10/991,969, dated Sep. 22, 2008.
Chan, Mun C. et al., "An architecture for broadband virtual networks under customer control." IEEE Network Operations and Management Symposium. Apr. 1996. pp. 135-144.
Chan, Mun C. et al "Customer Management and Control of Broadband VPN Services." Proc. Fifth IFIP/IEEE International Symposium of Integrated Network Management. May 1997. pp. 301-314.
Gasparro, D.M., "Next-Gen VPNs: The Design Challenge." Data Communications. Sep. 1999. pp. 83-95.
Hanaki, M. et al., "LAN/WAN management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.
Rao, J.R., Intranets and VPNs: Strategic Approach. 1988 Annual Review of Communications. 1998. pp. 669-674.
Tanenbaum, A.S., "Computer Networks." Upper Saddle River, N.J.: Prentice Hall PTR, 3rd Edition. 1996. pp. 348-364.
European Search Report for PCT/US03/37009 (dated Jul. 4, 2004) 2 pgs.
International Search Report for PCTUS03/17674. 6 pgs.
Notice of Allowance for U.S. Appl. No. 12/328,858 dated May 25, 2012.
Final Office Action for U.S. Appl. No. 12/328,858, dated Dec. 6, 2011.
Non-Final Office Action for U.S. Appl. No. 12/328,858, dated Apr. 15, 2011.
Notice of Allowance for U.S. Appl. No. 10/949,943 dated Jan. 9, 2009.
Non-Final Rejection for U.S. Appl. No. 10/949,943 dated Feb. 14, 2008.
Notice of Allowance for U.S. Appl. No. 12/467,304 dated Dec. 13, 2010.
Non-Final Rejection for U.S. Appl. No. 12/467,304 dated Oct. 18, 2010.
Tsiang et al. "RFC 2892, The Cisco SRP MAC Layer Protocol." Aug. 2000, pp. 1-52.
Zhang et al. "Token Ring Arbitration Circuits for Dynamic Priority Algorithms" IEEE, 1995, pp. 74-77.
Notice of Allowance for U.S. Appl. No. 13/015,880 dated Dec. 5, 2012.
Non-Final Rejection for for U.S. Appl. No. 13/015,880 dated Oct. 2, 2012.
Notice of Allowance for U.S. Appl. No. 13/756,071 dated Jun. 30, 2014.
Non-Final Rejection for U.S. Appl. No. 13/756,071 dated Jun. 6, 2014.
Non-Final Rejection for U.S. Appl. No. 13/532,771 dated Jan. 29, 2015.
Notice of Allowance for U.S. Appl. No. 15/469,094 dated Sep. 21, 2017.
Notice of Allowance for U.S. Appl. No. 15/192,115 dated Sep. 25, 2017.
Non-Final Rejection for U.S. Appl. No. 15/071,097 dated Sep. 27, 2017.

* cited by examiner

IDENTIFYING NODES IN A RING NETWORK

CROSS REFERENCE TO RELATED APPLICATIONS

This application is a continuation of U.S. patent application Ser. No. 14/828,277, filed Aug. 17, 2015, now U.S. Pat. No. 9,602,303, which is a continuation of U.S. patent application Ser. No. 13/532,771, filed Jun. 25, 2012, now U.S. Pat. No. 9,143,351, which is a continuation of U.S. patent application Ser. No. 12/762,362, filed Apr. 18, 2010, now U.S. Pat. No. 8,208,409, which is a divisional of U.S. patent application Ser. No. 11/460,977, now U.S. Pat. No. 7,890,663, filed on Jul. 29, 2006, which is a divisional of U.S. patent application Ser. No. 09/894,471, now U.S. Pat. No. 7,181,547, filed on Jun. 28, 2001, each of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2001-2016, Fortinet, Inc.

BACKGROUND

Field

Embodiments of the present invention generally relate to computer networks and more particularly to the identification of nodes on a ring network.

Description of the Related Art

The interest in the computer networks is growing every day, as more and more users want the capability to access information at remote locations. A computer network is composed of nodes and the communication links between the nodes. In order for a first node to access information at a remote node, the first node must have a way to know that the remote node exists. Thus, the nodes in the network need configuration information that described the topology of the other nodes in the network.

In prior networks, a predetermined master node would send a query to every node address asking whether a node exists at that address. When the master node received acknowledgment back, it would then know at which addresses other nodes existed. Whenever nodes were added to or removed from the network, the master node needed to repeat these queries to determine the new node topology, which was a time-consuming task. Thus, these prior networks suffered from heavy network traffic and performance problems. Further, if the master node was removed or disabled, the network had no way of determining the network topology.

Hence, there is a need for a solution that overcomes the problems of the prior art and provides an improved technique for determining network topology.

SUMMARY

Methods and systems are described for determining a token master on a ring network. According to one embodiment, a ring controller of a first blade of multiple blades participating in the ring network receives an indication that an arbitration token originated by an originating blade has been received. The ring controller compares the priority of the originating blade to the priority of the first blade. When the priority of the originating blade is higher, then the ring controller transmits the arbitration token to the next blade in the ring network. When the priority of the originating blade is lower, then the ring controller sets the first blade as the originating blade and transmits the arbitration token to the next blade. When the priority of the originating blade is equal, then the ring controller assumes the role of the token master, which is responsible for periodically transmitting a discovery marker onto the ring network to facilitate topology discovery by the blades.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods, systems and data structure are described for facilitating identification of nodes in a ring network. In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention. The following detailed description is, therefore, not to be taken in a limiting sense.

In the figures, the same reference number is used throughout to refer to an identical component which appears in multiple figures. Signals and connections may be referred to by the same reference number or label, and the actual meaning will be clear from its use in the context of the description.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form to electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing," "computing," "calculating," "determining," "displaying," or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission, or display devices.

Figure 1:
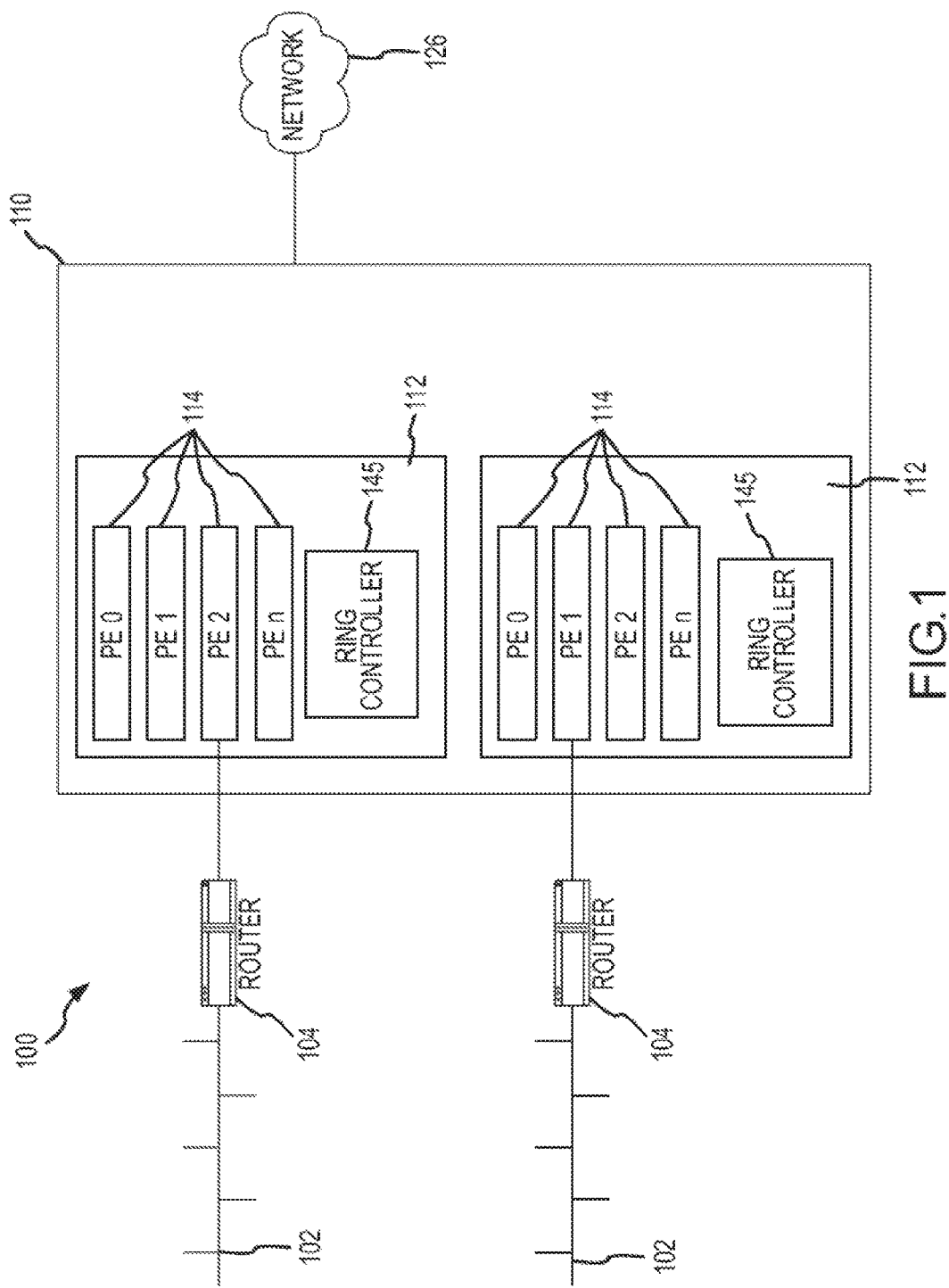
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, system 100 includes service processing switch 110, access routers 104, and network 116. In one embodiment, service processing switch 110 provides switching, routing, and computing resources that can be allocated by a service provider to customers. In one embodiment, service processing switch 110 is the IPSX 9000 service processing switch from CoSine Communications, Inc. But, the invention is not limited to any particular switch, router, or service processing hardware.

Service processing switch 110 includes one or more blades 112. In some embodiments, blades 112 have a type associated with them. Examples of blade types include processing functions such as network blades, control blades, trunk blades, and processor blades. Network blades provide interfaces to different types of networks. Control blades provide system management and accounting functions to service processing system 110. Trunk blades provide access to high speed trunk networks. Processor blades provide general purpose computer processors that in some embodiments provide firewall, intrusion detection, or directory services. Blades are communicably coupled to one another via a packet ring or rings, as further described below with reference to FIG. 2. Referring again to FIG. 1, each blade includes ring controller 145, which contains logic for interfacing to a ring network that connects the blades, as further described below with reference to FIGS. 3-5.

Referring again to FIG. 1, each of blades 112 includes one or more processing elements 114. Processing elements 114 includes CPUs and memory that provide computing resources for the blade, as further described below with reference to FIG. 2. Referring again to FIG. 1, the invention is not limited to any particular number of processing elements on a blade, nor is the invention limited to any particular number of blades in a service processing switch 110. Software tasks, in some embodiments, are split up such that one processor operates on one part of the data and another processor operates on another part of the data. In other embodiments, the various processing portions of a task all run on a single processor, multiprocessing with other tasks that share that processor. Thus, the hardware provides scalability, where low-end systems include few processors that do all the work, and high-end systems include one hundred or more processors and the work is distributed among the processors for greater speed and throughput.

Service processing system 110 is typically communicably coupled to a network 116, of example the Internet. Network 116 can also be a Wide Area Network (WAN), a Local Area Network (LAN), or a private network. Service processing system 110 is also typically communicatively coupled to a plurality of customer networks 102 via customer access routers 104.

Figure 2:
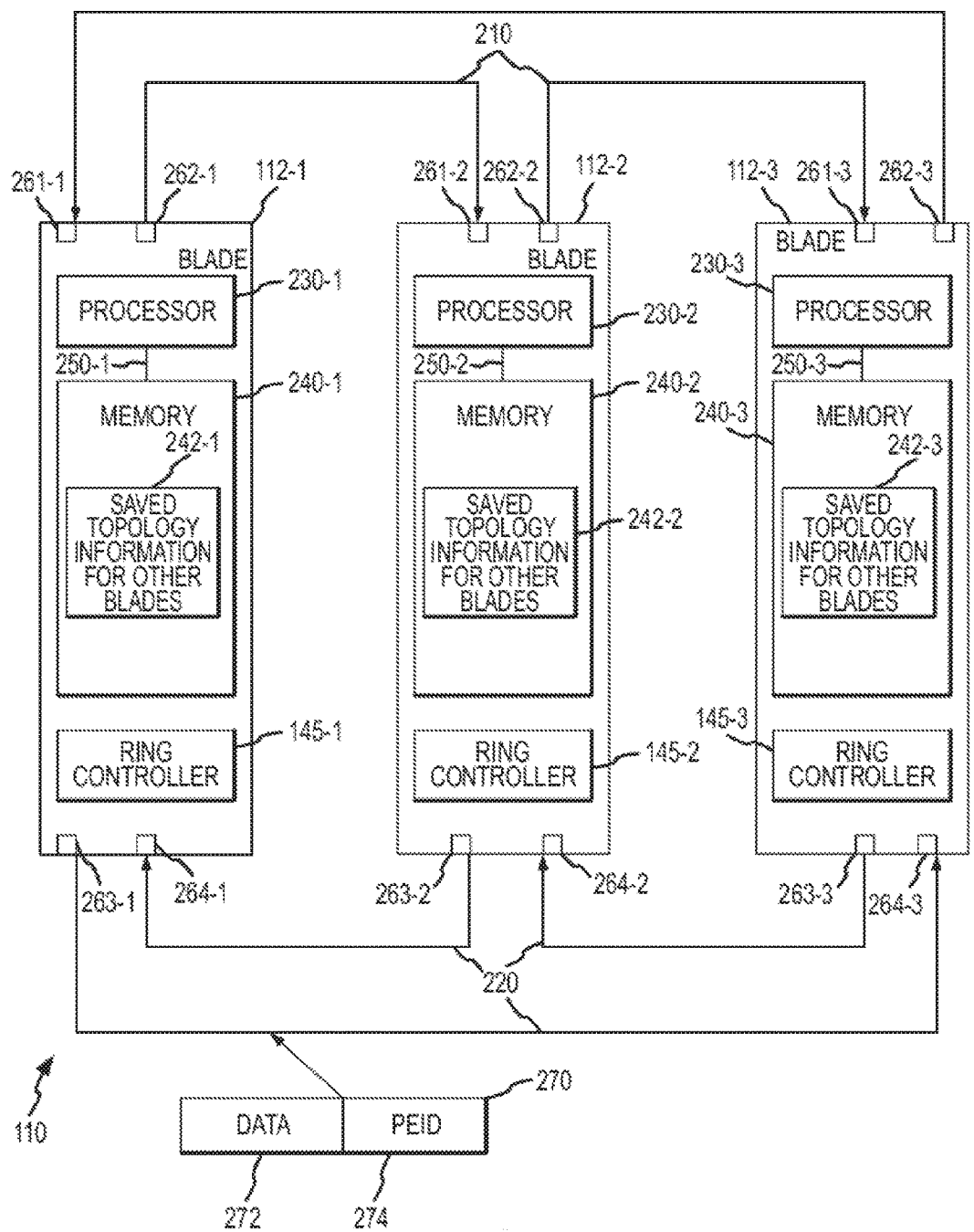
FIG. 2 is a block diagram of a multi-blade system connected via a ring network, according to an embodiment of the invention.

FIG. 2 is a block diagram of a multi-blade system connected via a ring network within service processing system 110, according to an embodiment of the invention. In some embodiments, each of two network rings 210 and 220 communicatively connect blades 112-1, 112-2, and 112-3 together. Although three blades are shown, in another embodiment any number can be present. Blade 112-1 contains processor 230-1 and memory 240-1 connected via system bus 250-1. Blade 112-1 also contains ring controller 145-1. Blade 112-2 contains processor 230-2 and memory 240-2 connected via system bus 250-2. Blade 112-1 also contains ring controller 145-2. Blade 112-3 contains processor 230-3 and memory 240-3 connected via system bus 250-3. Blade 112-1 also contains ring controller 145-3. Each blade optionally includes other hardware; for example although only one processor and memory are shown in the blades, each can contain multiple processors and multiple memories, as previously described above with reference to FIG. 1.

Referring again to FIG. 2, each memory 240-1, 240-2, and 240-3 contains respective topology information for the other blades 242-1, 242-2, and 242-3, which contains a discovery marker's connection state, the control blade master state, and blade characteristics. The topology information is further described below with reference to FIG. 5.

Referring again to FIG. 2, network ring 210 is a primary ring, which connects the blades in one direction, and network ring 220 is a protect ring, which connects the blades in the opposite direction. Primary ring 210 is used for normal packet transmission and reception, unless a break is detected in the ring as a result of blade failure or removal. When connection faults are detected, the affected blades begin using protect ring 220 to bypass the bad or missing connection. The packet ring hardware manages and discovers topology changes, and provides software with a current topology map, as further described below with reference to FIGS. 4 and 5.

Blade 112-1 contains primary-ring receive port 261-1, primary-ring transmit port 262-1, protect-ring transmit port 263-1, and protect-ring receive port 264-1. Blade 112-2 contains primary-ring receive port 261-2, primary-ring transmit port 262-2, protect-ring transmit port 263-2, and protect-ring receive port 264-2. Blade 112-3 contains primary-ring receive port 261-3, primary-ring transmit port 262-3, protect-ring transmit port 263-3, and protect-ring receive port 264-3.

Rings 210 and 220 are packet-passing rings. Each packet 270 placed in the rings includes a data portion 272 and a processor element identifier (PEID 274), which identifiers the destination processor for the packet. If the PEID matches a processor on its particular blade, the blade 112 passes the packet to the proper processor; if not, the packet is forwarded to the next blade. Although packet 270 is shown as traveling in ring 220, it can also travel in ring 210.

Although the embodiment of FIG. 2 has been described in the context of a network of blades within a switch, the invention applies equally to any nodes in a network, whether the nodes are contained within the same housing, located within the same room, or situated vast geographical distances apart.

In the previous section, a system level overview of the operation of exemplary embodiments of the invention was described. In this section, the particular methods of the invention performed by an operating environment executing an exemplary embodiment are described. In one embodiment the methods to be performed constitute computer programs made up of computer-executable instructions. But, in other embodiments the methods can be implemented using hardware in lieu of a processor-based system. Describing the methods enables one skilled in the art to develop such programs including such instructions to carry out the methods on suitable computers (the processor of the computer executing the instructions from computer-readable media). Describing the methods also enables one skilled in the art to develop hardware to carry out the described methods.

Figure 3:
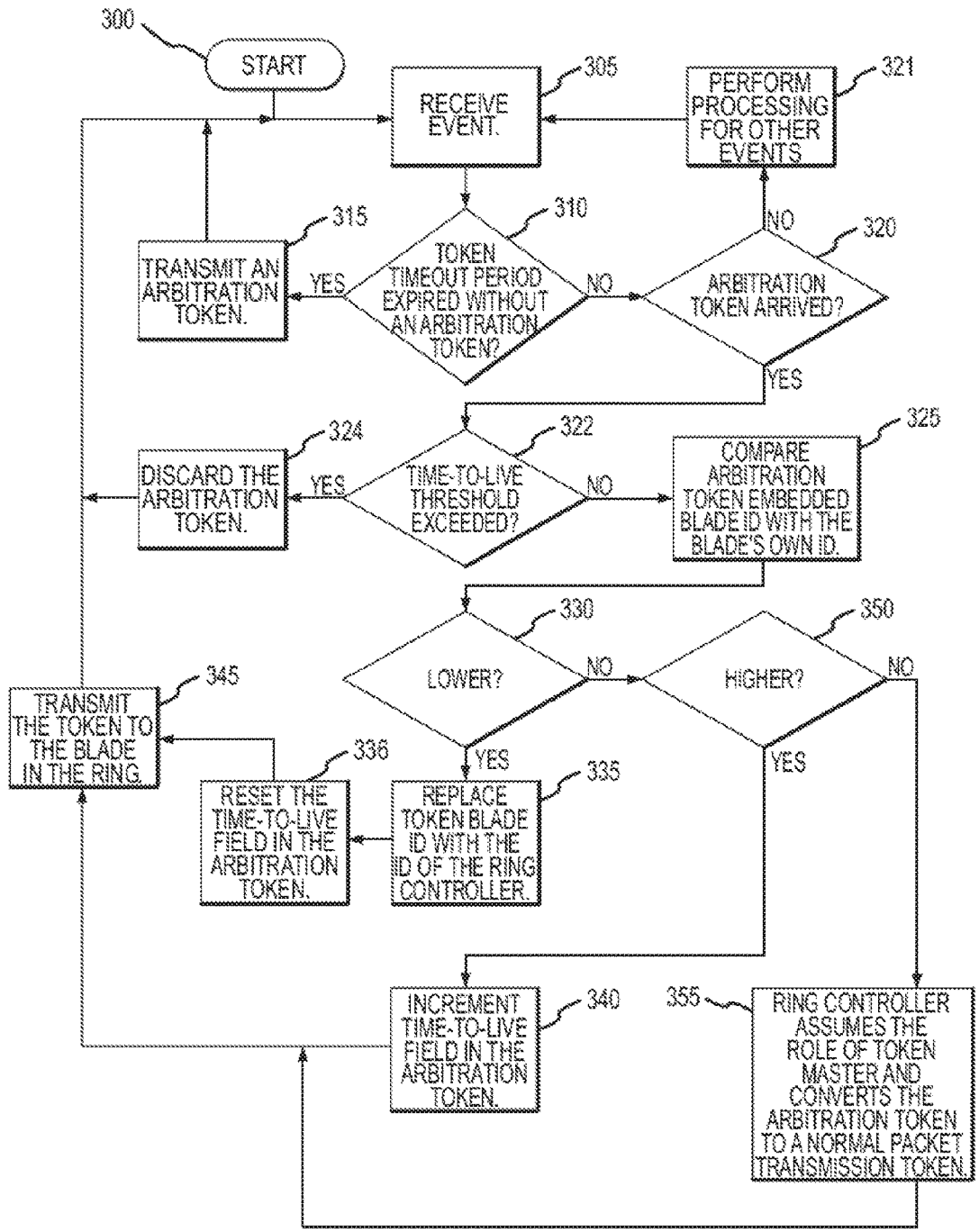
FIG. 3 is a flowchart of master blade arbitration logic, according to an embodiment of the invention.

FIG. 3 is a flowchart of token master blade arbitration logic, according to an embodiment of the invention. The functions described in FIG. 3 are carried out by any of blades 112. Packet rings 210 and 220 use a token arbitration scheme, allowing one blade (the blade that has most recently received a token marker) to transmit locally generated packets. A token marker is a one-cycle message with a unique encoding. At power-up, or after a connection state transition, a token may not be present in the packet ring. When this happens, a single blade takes responsibility for generating a token, so that packet transmission can proceed. This single blade is referred to as the token master blade, and the token master arbitration logic is described as follows.

Control begins at block 300. Control then continues to block 305 where an event is received at the blade. Control then continues to block 310 where blade 112 determines whether the event previously received at block 305 was a token timeout period expiration event. The token timeout period can expire, for example, when a blade insertion/removal event causes token loss or when no token has yet been generated following power-up.

If the determination at block 310 is true, then control continues to block 315 where blade 112 transmits an arbitration token on the ring network. In this way, a blade generates an arbitration token whenever a token timeout period has passed without detecting the arrival of a token. In one embodiment, the token timeout period is calculated by multiplying (max system blade count*(max packet delay+ring I/O latency)*clock period). In this token-based ring network, an arbitration token is passed around the nodes of the ring, and only the node that currently has the token has permission to send a packet on the ring. Control then returns to block 305, as previously described above.

If the determination at block 310 is false, then control continues to block 320 where blade 112 determines whether an arbitration token arrived event occurred at block 305. If the determination at block 320 is false, then control continues to block 321 where processing for other events occurs. Control then returns to block 305, as previously described above.

If the determination at block 320 is true, then control continues to block 322 where blade 112 determines whether the time-to-live field in the received arbitration token exceeds the time-to-live threshold. If the determination at block 322 is true, then control continues to block 324 where blade 112 discards the arbitration token. Control then returns to block 305 as previously described above.

If the determination at block 322 is false, then control continues to block 325 where blade 112 compares the arbitration token blade ID with its own local blade ID. From block 325, control continues to block 330 where blade 112 determines whether the arbitration token blade ID is a lower priority than the ring controller blade ID. If the determination at block 330 is true, then control continues to block 335 where blade 112 replaces the token blade ID with the ID of the ring controller. Control then continues to block 336 where blade 112 resets the time-to-live field in the arbitration token. Control then continues to block 345 where blade 112 transmits the token to the next blade in the ring. Control then returns to block 305, as previously described above.

If the determination at block 330 is false, the control continues to block 350 where blade 112 determines whether the arbitration token blade ID is at a higher priority than the ring controller blade ID. If the determination at block 350 is true, then control continues to block 340 where blade 112 increments the time-to-live field in the arbitration token. Control then controls to block 345, as previously described above.

If the determination at block 350 is false, then the arbitration token blade ID has an equal priority to the ring controller blade ID, so control continues to block 355 where blade 112 makes itself the token master blade and converts the received arbitration token to a normal packet transmission token. Thus, once the arbitration token previously generated at block 315 is passed all the way around the ring network and back to this blade unmodified by any higher priority blade, this blade becomes the master blade. Control then continues to block 345, as previously described above.

Figure 4:
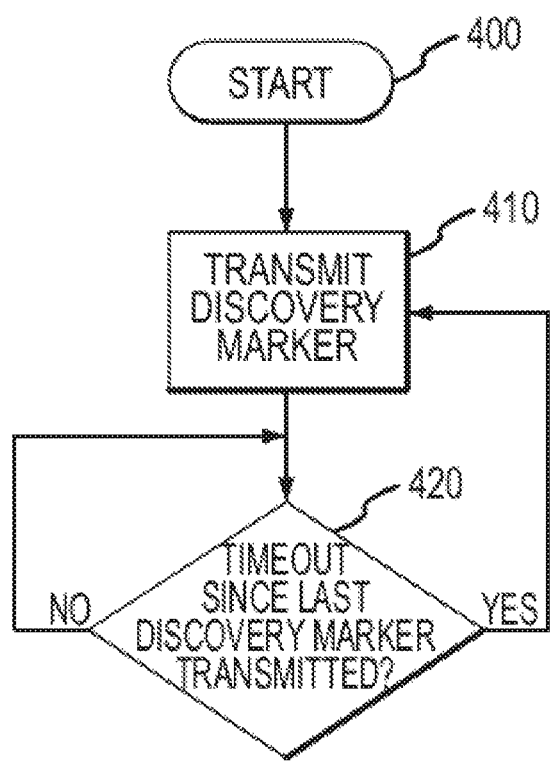
FIG. 4 is a flowchart of the master blade functions, according to an embodiment of the invention.

FIG. 4 is a flowchart of the token master blade functions, according to an embodiment of the invention. A blade became a token master blade as previously described above with reference to blocks 315 and 355. Control begins at block 400. Control then continues to block 410 where the master blade transmits a discovery marker. A discovery marker is further described below with reference to FIG. 6. Control then continues to block 420 where the master blade determines whether a period of time has expired since the last discovery marker was transmitted. If the determination at block 420 is false, then control returns to block 420. If the determination at block 420 is true, then control returns to block 410. In this way, the master blade periodically transmits a discovery marker.

Figure 5:
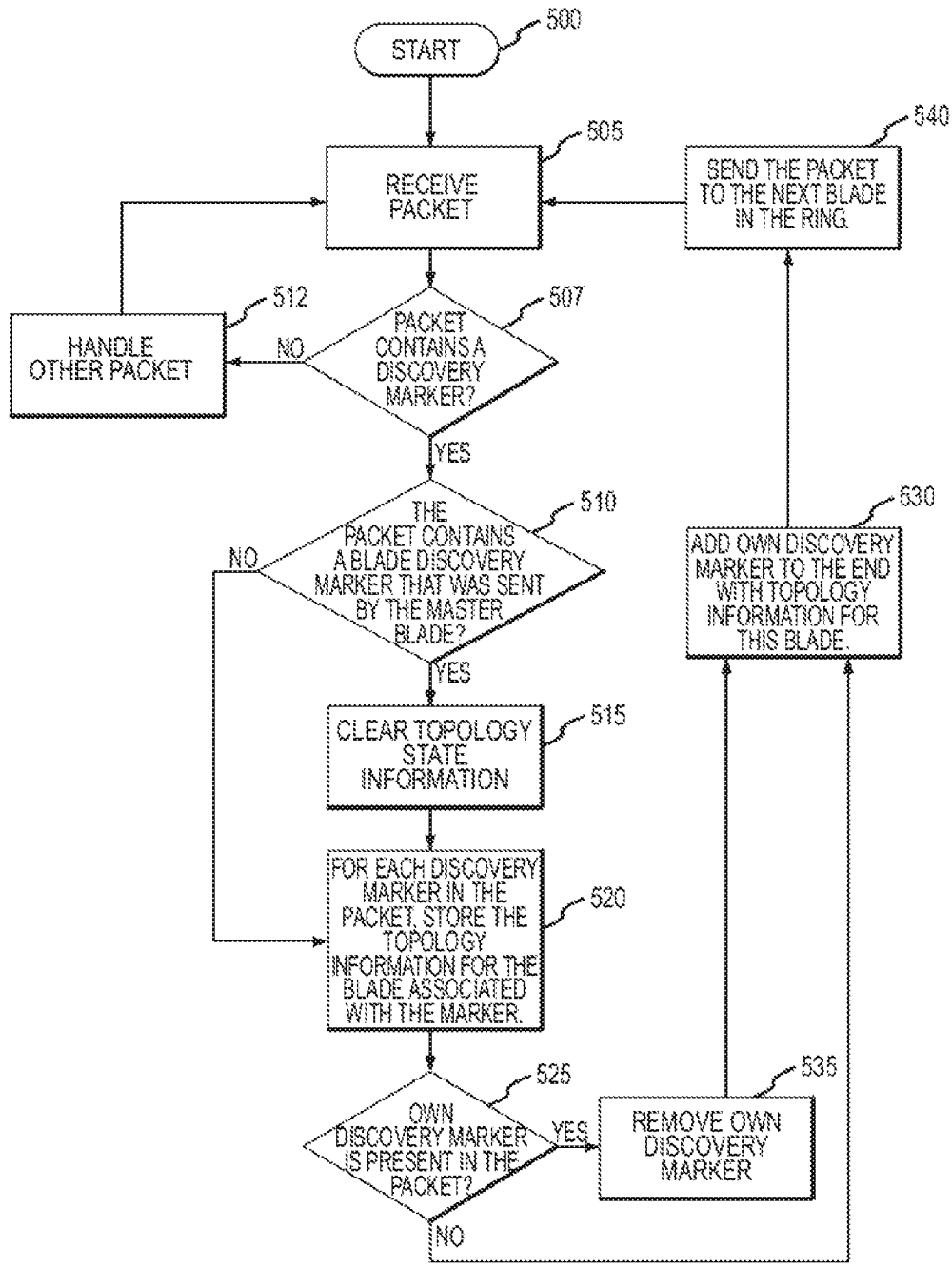
FIG. 5 is a flowchart of blade discovery logic, according to an embodiment of the invention.

FIG. 5 is a flowchart of blade discovery logic, according to an embodiment of the invention. Control begins at block 500. Control then continues to block 500 where blade 112 receives a packet from the packet ring. Control then continues to block 507 where blade 112 determines whether the packet contains any discovery markers. If the determination at block 507 is false, then control continues to block 512 where other types of packets are handled. Control then returns to block 505, as previously described above.

If the determination at block 507 is true, then control continues to block 510 where blade 112 determines whether any of the discovery markers in the packet were sent by the master blade. A blade discovery marker was sent at block 410, as previously described above with reference to FIG. 4.

Referring again to FIG. 5, if the determination at block 510 is true, then control continues to block 515 where blade 112 clears its topology information (242-1, 242-2, or 242-3, depending on the blade) for all known blades. Control then continues to block 520 where blade 112, for each marker in the packet, stores the topology information for the blade associated with the marker.

If the determination at block 510 is false, then control continues directly to block 520, as previously described above.

From block 520, control then continues to block 525 where blade 112 determines whether its own discovery marker is present in the packet. If the determination is false, then control continues to block 530 where blade 112 adds its own discovery marker to the end of the packet, including its own topology information. Control then continues to block 540 where blade 112 sends the packet to the next blade in the ring. Control then returns to block 505, as previously described above.

If the determination at block 525 is true, the control continues to block 535 where blade 112 removes its own discovery marker from the packet. Control then continues to block 530, as previously described above.

In this way all blades in the packet ring see a discovery marker and associated topology information for every other active blade.

Figure 6:
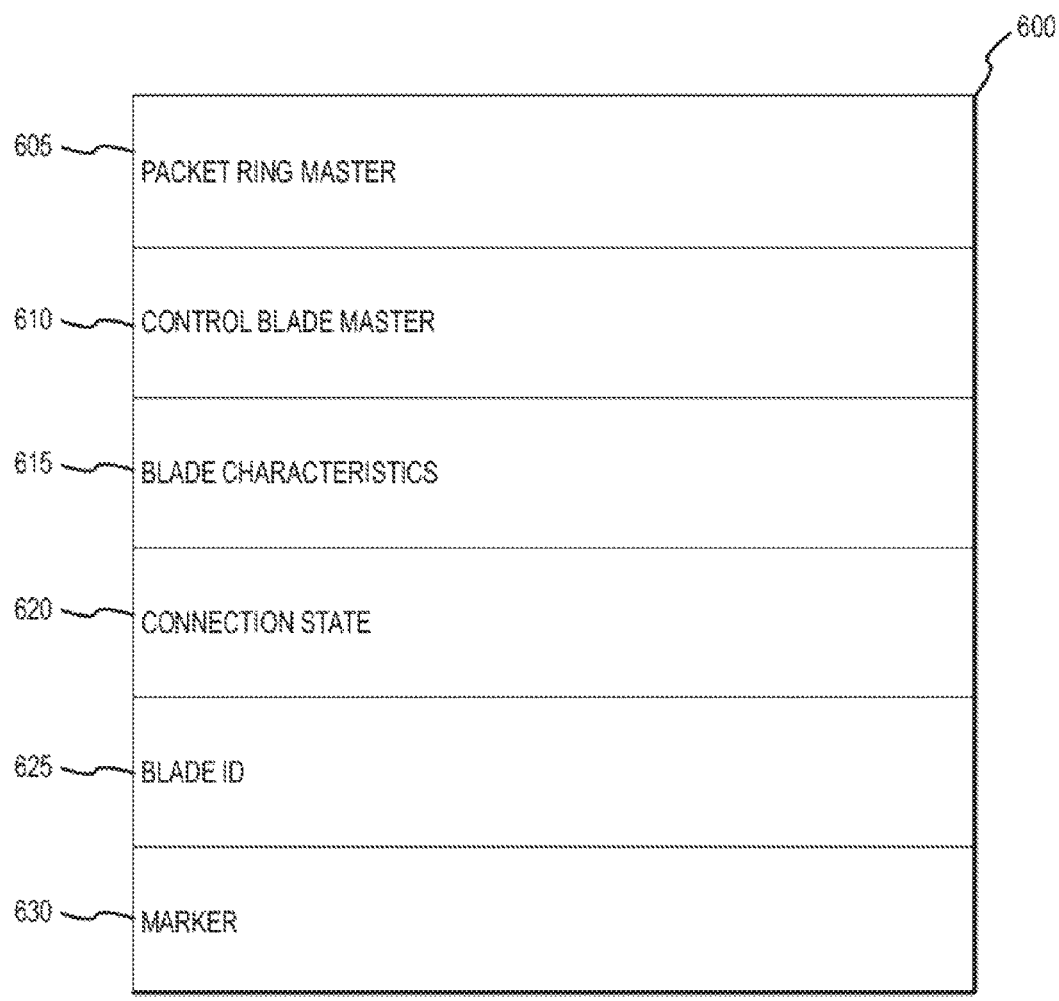
FIG. 6 describes a discovery marker data structure, according to an embodiment of the invention.

FIG. 6 describes discovery marker data structure 600, according to an embodiment of the invention. Discovery marker data structure 600 includes packet ring master field 605, control blade master field 610, blade characteristics field 615, connection state field 620, blade ID field 625, and marker field 630.

Packet ring master field 605 contains an indication of whether the originating blade is the current packet ring token master blade. Control blade master field 610 contains an indication of whether the blade is the control blade master. Blade characteristics field 615 specifies per-blade characteristics, which is information that can be used to distinguish the features of the blade.

Connection state field 620 contains an indication of the blade's current connection state for its primary and protect ring neighbors. Connection state field 620 allows blades to only switch-in a neighboring blade when both blades agree that the connection is good. It also allows a blade that detect a connection fault to notify their neighbor before switching out. This prevents situations where one side of a connection switches while the other side does not, causing a long-term break in the packet ring.

Blade ID field 625 contains a slot identifier for the associated blade. Marker field 630 identifies this marker as a blade discovery marker.

What is claimed is:

1. A method comprising:
receiving, by a ring controller of a first blade of a plurality of blades participating in a ring network, an indication that an arbitration token originated by an originating blade of the plurality of blades has been received, wherein each blade of the plurality of blades has a priority;
comparing, by the ring controller, the priority of the originating blade to the priority of the first blade;
when the priority of the originating blade is higher than the priority of the first blade, then transmitting, by the ring controller, the arbitration token to a next blade of the plurality of blades;
when the priority of the originating blade is lower than the priority of the first blade, then setting, by the ring controller, the first blade as the originating blade and transmitting the arbitration token to the next blade; and
when the priority of the originating blade is equal to the priority of the first blade, then assuming, by the ring controller, a role of a token master, wherein the token master is responsible for periodically transmitting a discovery marker onto the ring network, wherein the discovery marker facilitates topology discovery by the plurality of blades.

2. The method of claim 1, further comprising:
receiving, by the ring controller, an indication that a token timeout period for receipt of an arbitration token has expired; and
responsive to the indication, transmitting, by the ring controller, a new arbitration token onto the ring network, wherein possession of the arbitration token or the new arbitration token by a blade of the plurality of blades represents permission for the blade to transmit network traffic on the ring network.

3. The method of claim 2, wherein the token timeout period has expired as a result of (i) loss of the arbitration token due to insertion or removal of one of the plurality of blades or (ii) the arbitration token not yet being generated following power-up of a switch of which the plurality of blades are a part.

4. The method of claim 2, further comprising:
prior to said comparing, by the ring controller, the priority of the originating blade to the priority of the first blade, determining, by the ring controller, whether a time-to-live (TTL) threshold has been exceeded based on a TTL field contained in the arbitration token; and
when the TTL threshold has been exceeded, then discarding, by the ring controller, the arbitration token.

5. The method of claim 4, further comprising prior to said transmitting, by the ring controller, the arbitration token to a next blade of the plurality of blades, incrementing, by the ring controller, the TTL field.

6. The method of claim 4, further comprising prior to said transmitting the arbitration token to the next blade, resetting, by the ring controller, the TTL field.

7. The method of claim 1, wherein each blade of the plurality of blades includes an identifier (ID) and wherein the priority of a particular blade of the plurality of blades is represented by the ID of the particular blade.

8. The method of claim 7, wherein the arbitration token contains an originating blade ID field and wherein said setting, by the ring controller, the first blade as the originating blade comprises setting the originating blade ID field to the ID of the first blade.

9. The method of claim 2, wherein the token timeout period is determined based on a maximum blade count, a maximum packet delay, a latency of the ring network and a clock period.

10. The method of claim 9, wherein the token timeout period comprises the maximum blade count*(the maximum packet delay+the latency)*the clock period.

11. A non-transitory computer-readable storage medium embodying a set of instructions, which when executed by a ring controller of a first blade of a plurality of blades participating in a ring network, cause the ring controller to perform a method comprising:
receiving an indication that an arbitration token originated by an originating blade of the plurality of blades has been received, wherein each blade of the plurality of blades has a priority;

comparing the priority of the originating blade to the priority of the first blade;

when the priority of the originating blade is higher than the priority of the first blade, then transmitting the arbitration token to a next blade of the plurality of blades;

when the priority of the originating blade is lower than the priority of the first blade, then setting the first blade as the originating blade and transmitting the arbitration token to the next blade; and when the priority of the originating blade is equal to the priority of the first blade, then assuming a role of a token master, wherein the token master is responsible for periodically transmitting a discovery marker onto the ring network, wherein the discovery marker facilitates topology discovery by the plurality of blades.

12. The non-transitory computer-readable storage medium of claim 11, wherein the method further comprises:

receiving an indication that a token timeout period for receipt of an arbitration token has expired; and responsive to the indication, transmitting a new arbitration token onto the ring network, wherein possession of the arbitration token or the new arbitration token by a blade of the plurality of blades represents permission for the blade to transmit network traffic on the ring network.

13. The non-transitory computer-readable storage medium of claim 12, wherein the token timeout period has expired as a result of (i) loss of the arbitration token due to insertion or removal of one of the plurality of blades or (ii) the arbitration token not yet being generated following power-up of a switch of which the plurality of blades are a part.

14. The non-transitory computer-readable storage medium of claim 12, wherein the method further comprises:

prior to said comparing the priority of the originating blade to the priority of the first blade, determining whether a time-to-live (TTL) threshold has been exceeded based on a TTL field contained in the arbitration token; and when the TTL threshold has been exceeded, then discarding the arbitration token.

15. The non-transitory computer-readable storage medium of claim 14, wherein the method further comprises prior to said transmitting the arbitration token to a next blade of the plurality of blades, incrementing the TTL field.

16. The non-transitory computer-readable storage medium of claim 14, wherein the method further comprises prior to said transmitting the arbitration token to the next blade, resetting the TTL field.

17. The non-transitory computer-readable storage medium of claim 11, wherein each blade of the plurality of blades includes an identifier (ID) and wherein the priority of a particular blade of the plurality of blades is represented by the ID of the particular blade.

18. The non-transitory computer-readable storage medium of claim 17, wherein the arbitration token contains an originating blade ID field and wherein said setting the first blade as the originating blade comprises setting the originating blade ID field to the ID of the first blade.

19. The non-transitory computer-readable storage medium of claim 12, wherein the token timeout period is determined based on a maximum blade count, a maximum packet delay, a latency of the ring network and a clock period.

20. The non-transitory computer-readable storage medium of claim 19, wherein the token timeout period comprises the maximum blade count*(the maximum packet delay+the latency)*the clock period.

* * * * *